March 17, 1925.  L. HARRIS  1,530,115
WOOD SAWING MACHINE
Filed June 30, 1922
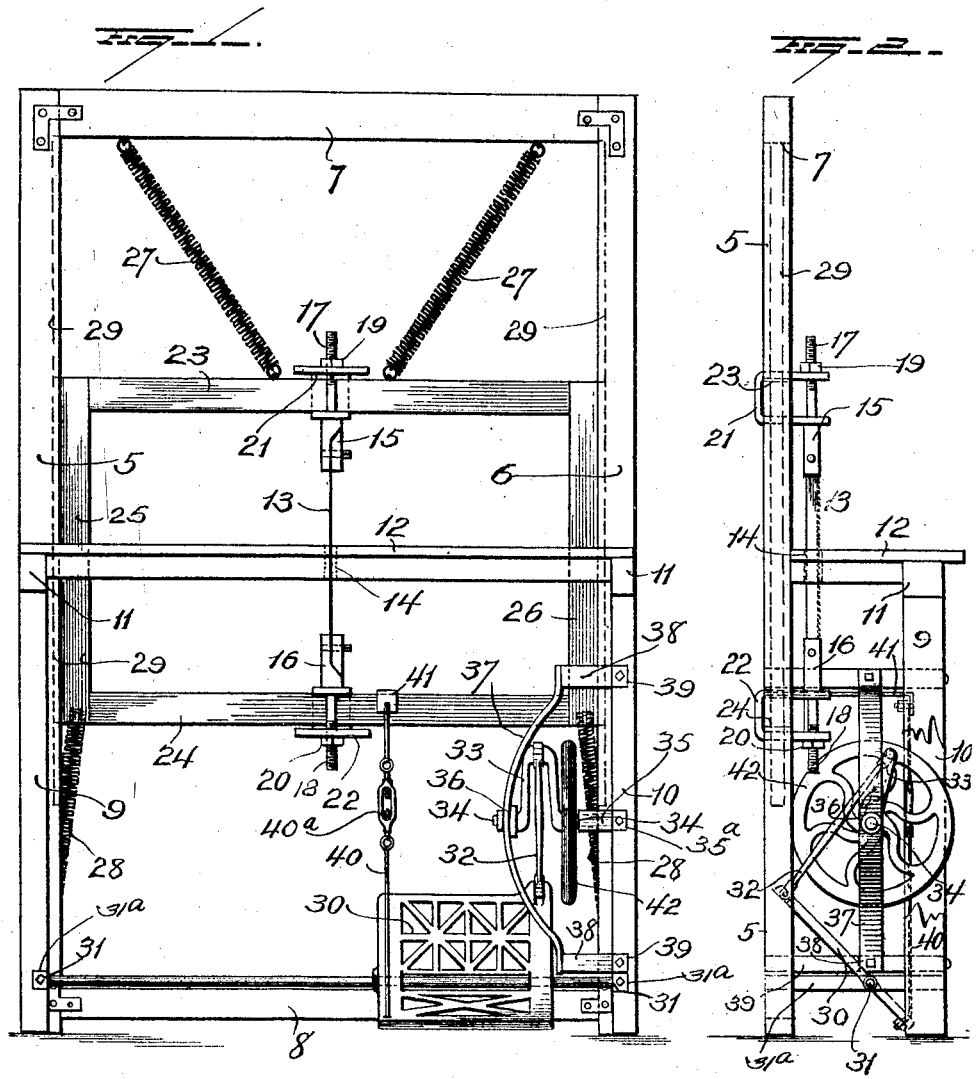

Patented Mar. 17, 1925.

1,530,115

UNITED STATES PATENT OFFICE.

LOUIS HARRIS, OF NASHVILLE, TENNESSEE.

WOOD-SAWING MACHINE.

Application filed June 30, 1922. Serial No. 571,907.

*To all whom it may concern:*

Be it known that I, LOUIS HARRIS, a citizen of the United States, and a resident of Nashville, in the county of Davidson and State of Tennessee, have invented certain new and useful Improvements in Wood-Sawing Machines; and I do hereby declare the following to be a full, clear, and exact description of the invention, such as will enable others skilled in the art to which it appertains to make and use the same.

This invention relates to wood sawing machines and more particularly to a machine in the nature of a scroll or jig saw and it has for its object to provide a novel and improved type of machine of this character by means of which any design or pattern, including curves and the like may be easily and quickly sawed from a suitable piece of material.

Further objects and advantages of the invention will be set forth in the detailed description which follows.

In the accompanying drawing:

Fig. 1 is a front elevation of a sawing machine constructed in accordance with the invention; and Fig. 2 is a side elevation thereof with a part of the side of the frame of the machine removed.

Like numerals designate corresponding parts in both of the figures of the drawing.

The frame of the machine comprises rear vertical members 5 and 6 the lower portions of which constitute rear legs, upper and lower horizontal members 7 and 8, vertical front legs 9 and 10 and a horizontal front cross-bar 11. A work supporting table 12 is supported from the rear frame members and the front legs. A saw 13 passes through an opening 14 formed in the table 12 and the upper and lower ends of the saw are secured in saw clamps 15 and 16, respectively. These saw clamps carry threaded extensions 17 and 18 having nuts 19 and 20 threaded thereon, said extensions passing through and being vertically adjustable in U shaped brackets 21 and 22. It is manifest that adjustment of the nuts 19 and 20 will adjust the tension of the saw blade 13. The brackets 21 and 22 are carried by the horizontal cross-bars 23 and 24 which, together with the vertical bars 25 and 26 constitute a floating, vibratory frame. Springs 27 are connected at their lower ends to the upper cross-bar 23 and at their upper ends to the transverse frame member 7. Springs 28 are connected at their lower ends to the lower portions of the rear frame members 5 and at their upper ends to the lower portion of the floating vibratory frame. Thus it will be seen that the saw carrying frame is yieldably mounted for movement either upwardly or downwardly, said frame being guided in vertical channels 29 formed in the side frame members 5 and 6.

With a construction such as has been described it requires but very slight effort upon the part of the operator to impart a rapid vertical reciprocation to the frame and to the saw blade, carried thereby.

The necessary movement may be imparted to the saw carrying frame by means of a treadle 30 pivotally supported in suitable bearings 31. This treadle is connected by a connecting rod 32 to a crank 33 of a shaft 34 mounted in bearings 35 and 36, the latter bearing being formed upon a bearing strap 37 which is supported by means of brackets 38 from transverse bars 39, extending between the rear frame member 6 and the front leg 10. The bearing 35 is correspondingly supported from a transverse bar 35ª and the treadle 30 has its pivotal mounting in like transverse bars 31ª. The forward portion of the treadle is connected by a pull rod or wire 40 with a forwardly extending arm 41 carried by the lower cross-bar 24 of the vibratory, saw carrying frame. The shaft 34 carries a balance wheel 42 by which the movement of the treadle and connecting parts is rendered smooth and steady and the crank 33 is prevented from stopping on the center. It is manifest that operation of the treadle will impart a quick vibratory movement to the frame which movement will be cushioned in both directions by the springs. It is further apparent that since the entire weight of the frame is supported from the springs 27 the operator will not have to perform the work of lifting the frame but will merely have to use enough power to keep the frame in motion.

In order to insure that, due to lengthening of the springs 27 in use, the operator will not have to physically lift the frame, the connecting rod or wire 40 may be provided with a turn buckle 40ª in its length so that the length of this connecting element may be so adjusted that the weight of the vibratory frame will be upon the springs 27 rather than upon the connecting element.

It is to be understood that the invention is not limited to the precise construction set forth but that it includes within its purview whatever changes fairly come within either the terms or the spirit of the appended claim.

Having described my invention what I claim is:

A jig saw comprising a rigid rear frame, a rigid front frame of less height than the rear frame, rigid connections between the frames, a bench secured to the rear frame and to the upper end of the front frame, a rigid saw-carrying frame slidably fitted at its ends in the sides of the rear frame, resilient connections between the top of the saw-carrying frame and the rear rigid frame, resilient connections between the bottom of the saw carrying frame and the rigid rear frame whereby the saw-carrying frame will be yieldably supported and normally held at a point midway the height of the rear frame, a vertical saw mounted centrally on the front side of the saw-carrying frame and passing through the bench, a treadle mounted between the lower portions of the front and rear frames. a connection between the front end of the treadle and the lower end of the saw-carrying frame, a crank shaft mounted on the connections between the front and rear frames, a link connecting the rear end of the treadle with the crank shaft, and a fly wheel on the crank shaft.

In testimony whereof, I have signed this specification in the presence of two subscribing witnesses.

LOUIS HARRIS.

Witnesses:
J. E. SCOBEY, Jr.,
J. B. DIEHL.